Feb. 14, 1939.  G. ZOTOS  2,147,476
METHOD OF HEATING FURNACES FOR MELTING GLASS,
SILICATES, AND OTHER REFRACTORY MATERIAL
Filed Feb. 9, 1937
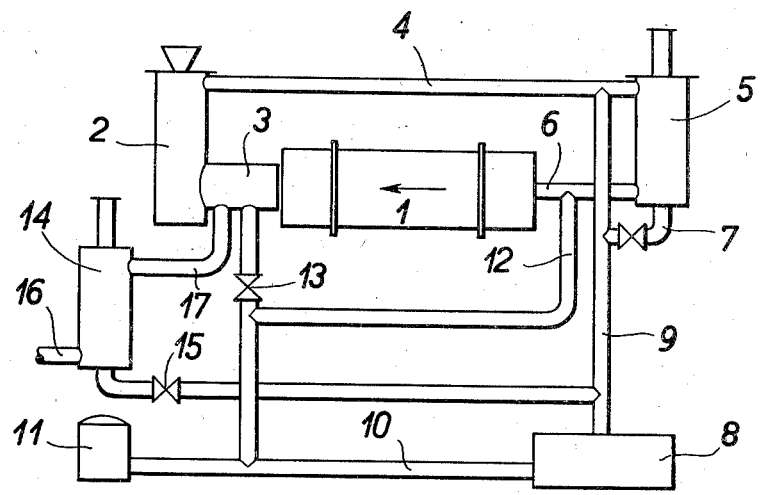
*Inventor:*

UNITED STATES PATENT OFFICE 2,147,476

METHOD OF HEATING FURNACES FOR MELTING GLASS, SILICATES, AND OTHER REFRACTORY MATERIAL

Georg Zotos, Berlin-Charlottenburg, Germany

Application February 9, 1937, Serial No. 124,939
In Germany February 14, 1936

4 Claims. (Cl. 263—52)

It is known that melting glass, silicates and other refractory material by means of a coal-dust, gas or oil flame can be effected in revolving-tube furnaces, especially in such furnaces of this kind as rotate rapidly and which are distinguished by the liquid or pasty content in the combustion chamber spreading nearly uniformly all over the wall of this chamber, the greatest possible surface being thus exposed to the influence of the heating flame. This method, in which the material to be melted assumes the form of a hollow cylinder, is especially useful when the melting process requires exceedingly high temperatures as can be obtained by considerably preheating the combustion air and supplying oxygen.

The usual method of utilizing the heat of the waste gases of the furnace for preheating the air and the oxygen proved surprisingly not to be very economic when exceedingly high temperatures are concerned. Much better results are obtained in this respect by chemical recovery of the heat of the waste gases. This recovery can be so effected according to the invention that the highly superheated waste gas due to combustion is regenerated partly or entirely by means of reducing substances immediately after its having left the furnace, that the waste heat is compounded chemically, and that the regenerated waste gas is reconducted as a combustible in continuous circulation to the furnace at least partly. When the combustion products, which consist substantially of very hot $CO_2$ and very hot aqueous vapour, are intimately connected with reacting, preferably solid and pre-dried, substances, for instance coal, the thermal energy of the melting process is regenerated and there is produced by reduction a combustible gas which is of high calorific value and can be used directly for heating the furnace, which means that the heat of the waste gas is not used for preheating only, as has been the practice so far. When the heating of the furnace is intensified by oxygen, the method according to the invention can be used for producing a gas by means of which highest heating temperatures can be obtained economically and, contrary to the known proceedings, without costly heat recovering devices, for instance recuperators, and without special gas of high quality being required. The combustibles used for reduction may be of comparatively poor quality and therefore cheap. Ordinary brown-coal briquettes, mineral coal, etc., can be taken without their requiring any previous gasification in special plants. The recovery of energy by regeneration of the waste-gas heat being effected very quickly, only comparatively small apparatus are necessary, which are far cheaper than special gas plants. The method according to the invention works so favourably that it can be used to advantage not only for processes requiring especially high temperatures but also in ordinary melting and other proceedings, for instance in making special glasses. The acceleration the method produces in the melting process entails an increase in efficiency.

It is not absolutely necessary to preheat the oxygen eventually supplied to the flame heating the furnace, but it is advisable to preheat the regenerated gas, which is cooled more or less. This preheating is conveniently effected by burning part of the regenerated waste gas and making this combustion heat a superheater for superheating the gas to be redirected to the furnace. As a rule, however, this heating of the waste gas is necessary only when especially high temperatures are to be obtained in the furnace, namely temperatures required for melting very refractory substances, for instance oxides.

In the continuous circulation of the method according to the invention, there is generally created an excess of regenerated gas. This excess can be used advantageously for the energies required by other apparatus, for instance gas motors, or for heating boilers. Naturally, also liquid combustibles or gases can be used for reducing the waste gases, since substances suitable for the reduction in the desired regeneration, for instance methane, are to be found among these substances as well. Although the direct use of these combustibles is favourable in the heating of the furnace in thermal respect, much better economic results may be yielded eventually indirectly by means of waste gas. Regardless of what combustible is taken, the process in the furnace itself is to be taken into consideration, and it is to be examined what quantities of excess gas are desired. A considerable surplus of regenerated waste gas can be eventually obtained by supplying oxygen to the very hot waste gas leaving the furnace. Using oxygen in the process of gasifying combustibles is known in itself, but it has not been suggested as yet to supply oxygen to highly heated waste gases. If, on account of high temperatures, difficulties and disturbances are to be feared in the working of the plant, the oxygen will have to be supplied to the waste gas slowly and in small quantities. The melting process may eventually be improved by adding acqueous vapour to the waste gas leaving the furnace. It is advisable in this case, however, to previously superheat this vapour as much as possible, which can best be effected by branching off part of the gas in excess and using this part for heating a special device for superheating the aqueous vapour.

The accompanying drawing illustrates schematically a plant for the method according to the invention.

The drum 1 of a rapidly revolving tube furnace is rotatable about its longitudinal axis and connected by means of an insulated chamber 3 to a gasifier 2. From this gasifier 2, a tube 4 leads to a superheater 5 connected to a burner 6 of the revolving-tube furnace. To the tube 4 is connected a branch tube whose one part 7 leads through a stop valve to the superheater 5, and whose other part 9 is connected to an oxygen plant 8. This oxygen plant 8 is connected by means of a tube 10 to a gas tank 11. To the tube 10 is connected a tube which has two branches, the one branch leading into a tube 12 that ends in the burner 6, and the other branch leading through a stop valve 13 and into the chamber 3 connected to the gasifier 2. To the tube 9 is connected a tube which contains a stop valve 15 and leads into a superheater 14 having a supply tube 16 and a draining tube 17. Also this draining tube 17 leads into the chamber 3 connected to the gasifier 2.

The combustion gases flow through the furnace 1 in the direction indicated by the arrow, whence they are directed in highly superheated condition through the chamber 3 and into the gasifier 2. The gasifier 2 contains dry coal, which regenerates the entering waste gas. Through the tube 4, the regenerated gas arrives in the superheater 5, where it is heated, and whence it passes on to the burner 6. The heat required by the superheater 5 is obtained by burning part of the regenerated waste gas on the way through the tube 7. Another part of the regenerated waste gas is supplied by way of the tube 9 to the oxygen plant 8, whose requirements of energy are thus covered. The oxygen produced flows through the tube 10 to the gas tank 11, whence it is conducted by way of the tube 12 to the burner 6, and by way of the valve 13 to the gasifier 2. If required in the melting process, part of the regenerated gas supplied by the tube 9 to the oxygen plant 8 can be directed by means of the valve 15 into the superheater 14, where this gas is burnt for superheating the aqueous vapour supplied by the tube 16. The superheated aqueous vapour passes through the tube 17 into the gasifier 2.

It is characteristic of the method that gasifiers or, according to what combustible is used, similarly acting apparatus are placed direct behind the furnace, at the place generally occupied by plants for recovery of heat, and that special superheaters are used for the regenerated gas before this gas is reconducted in continuous circulation into the combustion chamber of the furnace. Moreover, the method is distinguished by an especially advantageous use of the exceeding gases, especially in the direct utilization of the energy of these gases in the production of oxygen, which has been effected so far only by utilizing the heat of the waste gases. The method can be used to advantage in all technical furnace plants, in so far as such plants are suitable for the utilization of the high temperatures arising.

I claim:

1. A method of heating a high-temperature rapidly revolving tube furnace for melting glass, silicates and other refractory material, by combustion of a fuel by means of oxygen, the method consisting in this that the highly superheated waste gas due to combustion is regenerated immediately after its exit from the furnace by means of a reducing substance, and that at least part of the regenerated waste gas is directed in continuous circulation into the furnace.

2. A method according to claim 1, consisting in the combustion of part of the regenerated waste gas, in heating a superheater by this combustion, and in superheating in this superheater the waste gas to be redirected to the furnace.

3. A method according to claim 1, consisting in the supply of oxygen to the waste gases leaving the furnace.

4. A method according to claim 1, consisting in the supply of highly superheated steam to the waste gases leaving the furnace.

GEORG ZOTOS.